(12) United States Patent
Chen

(10) Patent No.: US 7,410,287 B2
(45) Date of Patent: Aug. 12, 2008

(54) BACKLIGHT WITH LIGHT DIFFUSION AND BRIGHTNESS ENHANCEMENT STRUCTURES AND METHOD FOR PRODUCING SUCH

(75) Inventor: Ga-Lane Chen, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 39 days.

(21) Appl. No.: 11/408,431

(22) Filed: Apr. 21, 2006

(65) Prior Publication Data

US 2006/0239030 A1    Oct. 26, 2006

(30) Foreign Application Priority Data

Apr. 22, 2005   (CN)   .......... 2005 1 0034365

(51) Int. Cl.
*F21V 7/04* (2006.01)
(52) U.S. Cl. .......... 362/620; 362/607; 385/146
(58) Field of Classification Search ............ 362/618, 362/620, 617, 606–608
See application file for complete search history.

(56) References Cited

U.S. PATENT DOCUMENTS

| | | | | |
|---|---|---|---|---|
| 5,598,280 A | * | 1/1997 | Nishio et al. .......... | 349/57 |
| 5,771,328 A | * | 6/1998 | Wortman et al. .......... | 385/146 |
| 6,104,530 A | * | 8/2000 | Okamura et al. .......... | 359/359 |
| 6,259,496 B1 | | 7/2001 | Kashima | |
| 6,811,274 B2 | * | 11/2004 | Olczak .......... | 362/606 |
| 2002/0106830 A1 | * | 8/2002 | Ohmi et al. .......... | 438/69 |
| 2003/0165693 A1 | * | 9/2003 | Hartig et al. .......... | 428/426 |
| 2004/0027339 A1 | * | 2/2004 | Schulz .......... | 345/173 |
| 2005/0007000 A1 | * | 1/2005 | Chou et al. .......... | 313/116 |
| 2005/0024849 A1 | * | 2/2005 | Parker et al. .......... | 362/31 |
| 2005/0059766 A1 | * | 3/2005 | Jones et al. .......... | 524/431 |

* cited by examiner

*Primary Examiner*—Jong-Suk (James) Lee
*Assistant Examiner*—Julie A. Shallenberger
(74) *Attorney, Agent, or Firm*—Andrew C. Cheng

(57) ABSTRACT

A backlight device (100) includes a light guide plate (110), a light source (130) arranged at a side face of the light guide plate, a lamp cover (140) surrounding the light source, a light reflection plate (120) arranged below the light guide plate, a light diffusion plate (150) arranged over the light guide plate, and a brightness enhancement plate (160) arranged over the light diffusion plate. The light diffusion plate has a first optical film (151) and a plurality of first bumps (152) formed thereon and extending outwardly and toward the light guide plate. The brightness enhancement plate has a second optical film (161) and a plurality of second bumps (162) formed thereon and extending outwardly and away from the light diffusion structure.

9 Claims, 7 Drawing Sheets

BACKLIGHT WITH LIGHT DIFFUSION AND BRIGHTNESS ENHANCEMENT STRUCTURES AND METHOD FOR PRODUCING SUCH

FIELD OF THE INVENTION

The present invention relates to liquid crystal display (LCD) technology and, more particularly, to a backlight device having light diffusion and brightness enhancement structures and a method for manufacturing the same structures.

DESCRIPTION OF RELATED ART

In general, an LCD apparatus has many advantages over a CRT (Cathode Ray Tube) display apparatus, especially in respect of weight and size. The advantage of an LCD derives from its use of liquid crystal for providing images. The liquid crystal is controlled by an electric field. Under an applied electric field, liquid crystal molecules are oriented in a pre-determined direction parallel to a direction of the electric field. Light transmittance for providing images varies according to the orientations of the liquid crystal molecules.

The LCD apparatus requires a light source to illuminate the liquid crystal. The quality of the displayed images depends on uniformity of the light luminance and the brightness of the light.

A backlight device generally includes a light guide plate, and a light source arranged at a side thereof. Light originating from the light source enters into the light guide plate through a light incident surface thereof, is transmitted through and/or reflected within the light guide plate, and then emitted from a light emitting surface of the light guide plate. However, The light provided may have poor uniformity and unsatisfactory brightness.

What is desired is a backlight device having optical elements that is able to achieve a high uniformity of brightness.

SUMMARY

A backlight device provided herein includes: a light source; a light guide plate including a light incident surface for receiving light emitting from the light source, and a light emitting surface for emitting light therefrom; a light diffusion structure arranged over the light emitting surface of the light guide plate, the light diffusion structure having a first optical film and a plurality of first bumps formed thereon and extending outwardly and toward the light emitting surface; and a brightness enhancement structure arranged over the light diffusion structure. The brightness enhancement structure has a second optical film and a plurality of second bumps formed thereon, and extends outwardly and away from the light diffusion structure.

Furthermore, a method for manufacturing an optical plate of a backlight device is also provided herein. The backlight device includes a light source and a light guide plate, the optical plate arranged over and opposite to the light guide plate. The method generally includes the steps of: providing a transparent base; and depositing an optical film thereon by a sputtering process, the optical film having a plurality of micro bumps thereon configured for diffusing or concentrating light from the light guide plate originally emitted from the light source.

These and other features, aspects, and advantages of the present backlight device will become more apparent from the following detailed description and claims, and the accompanying drawings.

BRIEF DESCRIPTION OF THE DRAWINGS

Many aspects of the present backlight device can be better understood with reference to the following drawings. The components in the drawings are not necessarily drawn to scale, the emphasis instead being placed upon clearly illustrating the principles of the present backlight device. Moreover, in the drawings, like reference numerals designate corresponding parts throughout the several views.

DETAILED DESCRIPTION OF THE PREFERRED EMBODIMENTS

Figure 1:
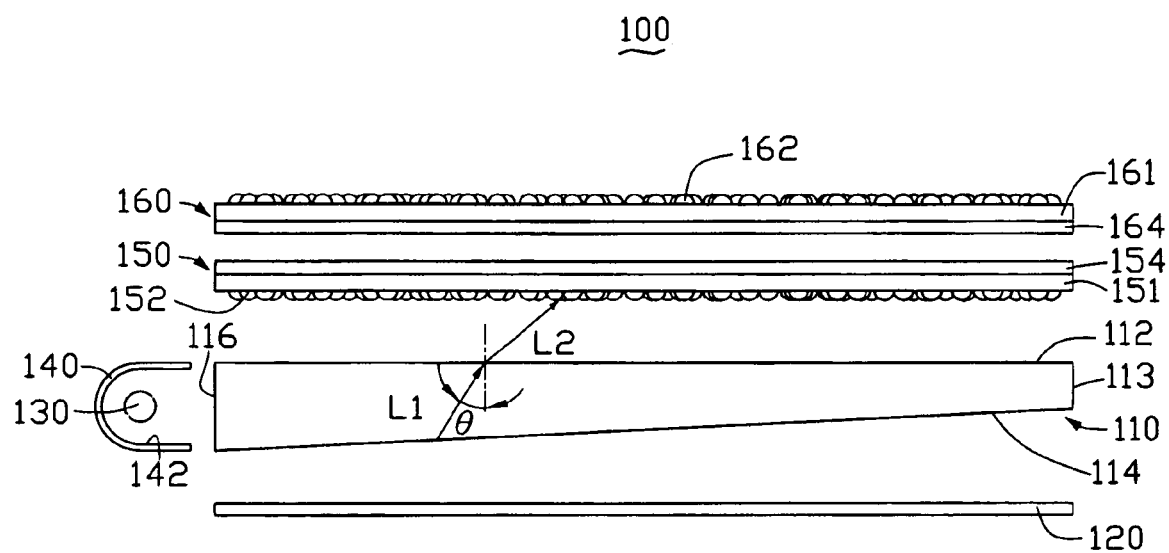
FIG. 1 is a schematic, isometric view of a backlight device, in accordance with a first embodiment.

Referring to FIG. 1, a backlight device 100 in accordance with a first embodiment is shown. The backlight device 100 includes a light guide plate 110, a light source 130 arranged at a side face of the light guide plate 110, a lamp cover 140 surrounding the light source 130, a light reflection plate 120 arranged below the light guide plate 110, a light diffusion plate 150 arranged over the light guide plate 110, and a brightness enhancement plate 160 arranged over the light diffusion plate 150.

The light source 130 is a linear light source, such as CCFL (Cold Cathode Fluorescent Light). Otherwise, point light sources, for example, LEDs, may be used instead. The lamp cover 140 has an inner reflection surface 142 facing towards the light source 130, and an opening facing towards the side face of the light guide plate 110. As a result, most light emitted from the light source will directly enter or be reflected by the inner reflection surface 142 of the lamp cover 140 to enter into the light guide plate 110.

The light guide plate 110 is a substantially flat or wedge-shaped sheet that includes a light incident surface 116, a light emitting surface 112, a light reflection surface 114, and several reflection side surfaces, such as side surface 113, formed, optionally, with reflecting layers thereon. The light incident surface 116 is the side surface of the light guide plate 110 disposed facing the light source 130 and is adapted/configured for receiving light emitted therefrom. The light reflection surface 114 is configured for reflecting the light incoming through the light incident surface 116. The light emitting surface 112 is opposite to the light reflecting surface 114 and is adapted for facilitating emission of light from the light guide plate 110, including the exit of the reflected light. In the illustrated embodiment, the light guide plate 110 is wedge-shaped. The light guide plate 110 is generally made of a transparent material, such as PMMA, another optical plastic, or an optical glass.

The light reflection plate 120 may be arranged below the light guide surface 110, and face the light reflection surface 114 thereof. Thereby, light exiting from the light reflection surface 114 will be reflected back to the light guide plate 110. Light energy loss will thus be decreased.

Figure 2:
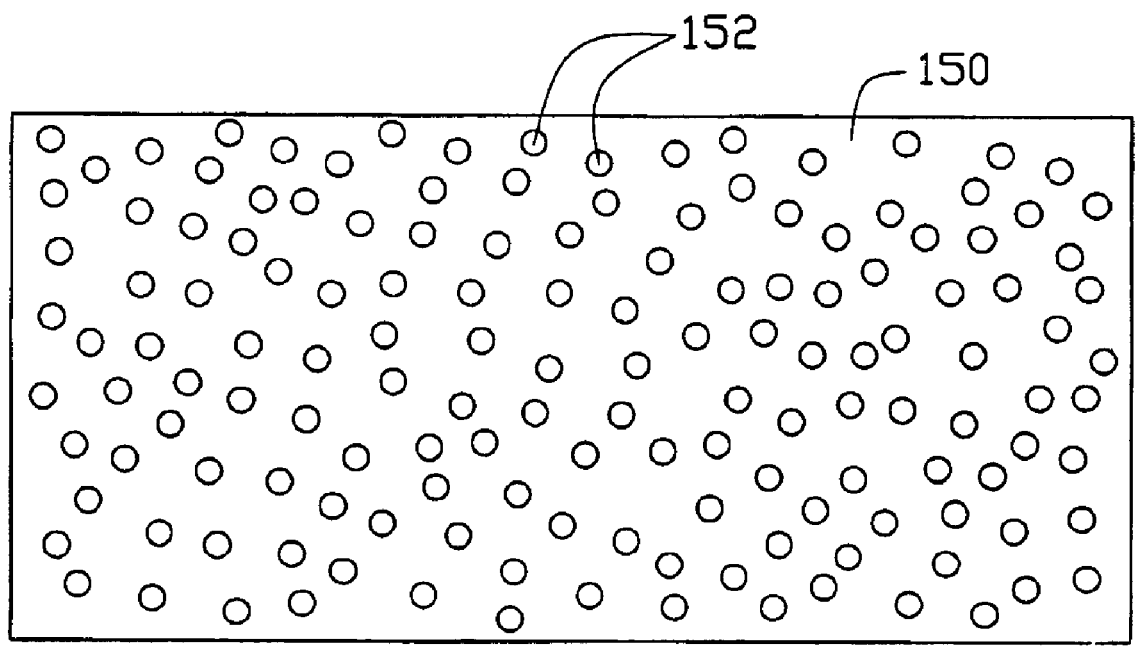
FIG. 2 is a schematic, bottom view of a light diffusion plate shown in FIG. 1.

Referring to FIGS. 1 and 2, the light diffusion plate 150 is arranged over the light emitting surface of the light guide plate 110. The light diffusion plate 150 includes a transparent base 154, a first optical film 151, and a plurality of first bumps 152. The first optical film 151 is formed on the base 154, and faces the light emitting surface 112 of the light guide plate 110. The first bumps 152 extend outwardly from the first optical film 151 toward the light emitting surface 112.

In the illustrated embodiment, the transparent base 154 is composed of polycarbonate or polymethyl methacrylate, and advantageously has a thickness in the range from about 0.5 millimeters to about 8 millimeters.

The first optical film 151 has an index of refraction in the range from about 1.4 to about 2.4, and preferably in the range from about 1.5 to about 2.2. Otherwise, The first optical film 151 has a thickness in the range from about 100 nanometers to about 300 nanometers. Furthermore, the first optical film 151 may also include a plurality of oxide particles. The oxide particles are uniformly distributed in the first optical film 151.

The first bumps 152 preferably have a height in the range from about 2 microns to about 10 microns. The first bumps have a diameter in the range from about 2 microns to about 50 microns.

Figure 3:
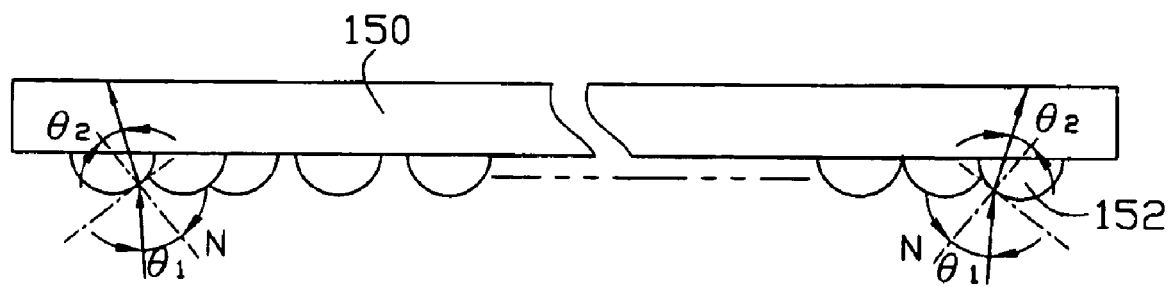
FIG. 3 is a schematic view showing light paths of the light diffusion plate shown in FIG. 1.

The first optical film 151 and the first bumps 152 are preferably composed of titanium dioxide, aluminium oxide, silicon oxide, or any combination thereof Referring to FIG. 3, light paths associated with the light diffusion plate 150 are shown. Light beams incident on the first bumps 152 are refracted thereat. According to Snell' law, the angle of refraction $\theta_2$ is smaller than the angle of incidence $\theta_1$ because the index of refraction of the first bumps 152 is greatel than the index of refraction of air (which is equal to about 1). That is, the incident light beams are diffused and uniformly distributed thereby.

Figure 4:
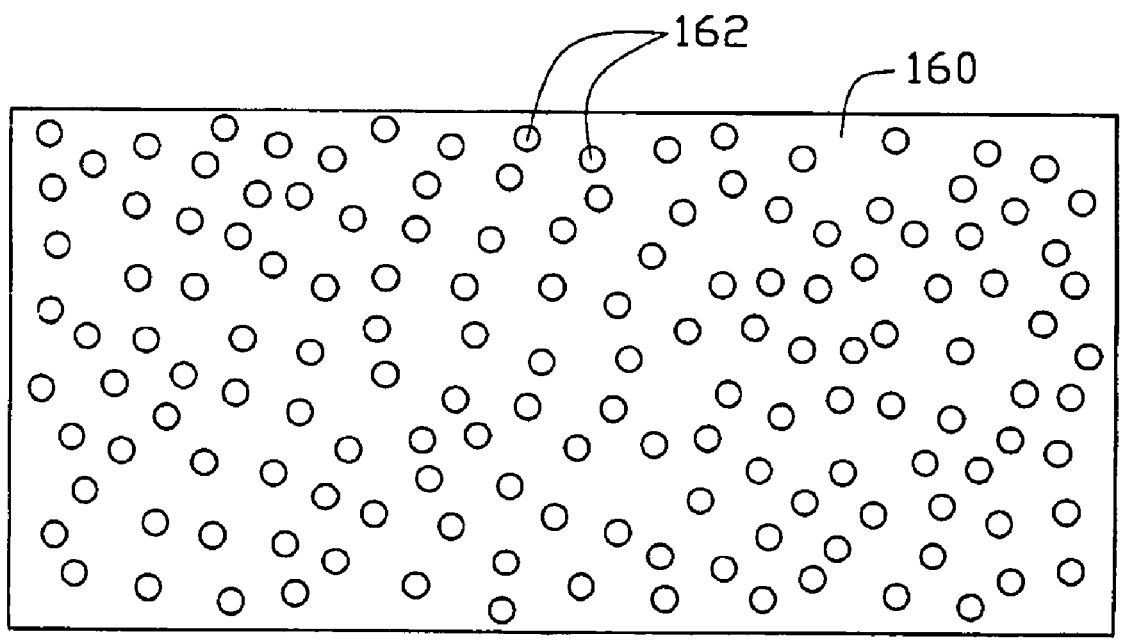
FIG. 4 is a schematic, top view of a brightness enhancement plate shown in FIG. 1.

Referring to FIGS. 1 and 4, the light concentration plate 160 is arranged over the light diffusion plate 150. The light concentration plate 160 includes a transparent base 164, a second optical film 161, and a plurality of second bumps 162. The second optical film 161 is formed on the base 164, and faces the light diffusion plate 150. The second bumps 162 extend outwardly from the second optical film 161 toward the light diffusion plate 150.

In the illustrated embodiment, the transparent base 164 is similar to the transparent base 154, and advantageously has the same thickness and/or material as those of the transparent base 154.

The second optical film 161 has an index of refraction in the range from about 1.4 to about 1.7, and preferably in the range from about 1.5 to 1.6. The second optical film 161 has a thickness in the range from about 100 nanometers to about 300 nanometers.

The second dumps 162 is similar to the first dumps 152, and advantageously have the same height and diameter as those of the first bumps 152.

The second optical film 161 and the second bumps 162 are preferably composed of titanium dioxide, aluminium oxide, silicon oxide, or any combination thereof.

Figure 5:
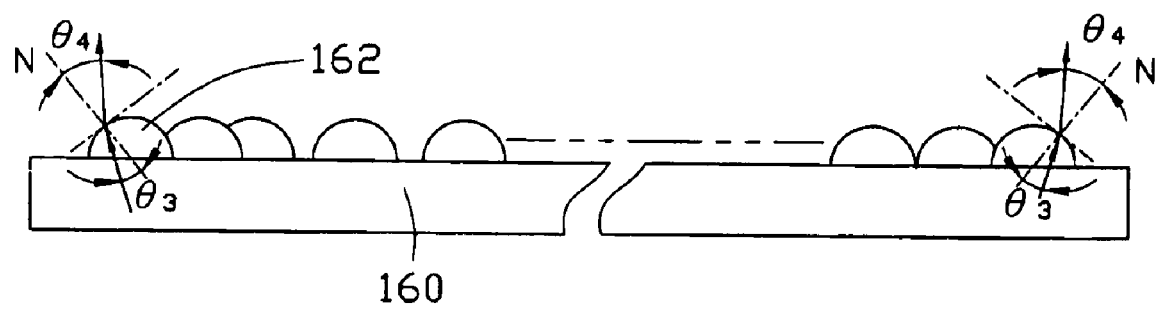
FIG. 5 is a schematic view showing light paths of the brightness enhancement plate shown in FIG. 1.

Referring to FIG. 5, light paths associated with the light concentration plate 160 are shown. Light beams, which exit from the second bumps 162 to the air, are refracted thereat. According to Snell' law, the angle of refraction $\theta_4$ is smaller than the angle of incidence $\theta_3$ because the index of refraction of the second bumps 162 is greater than the index of refraction of air. That is, the incident light beams are concentrated thereby. A brightness of the backlight device 100 in desired directions is accordingly enhanced.

Furthermore, a method for manufacturing the light diffusion plate 150 or the light concentration plate 160 is shown. The method generally includes the steps of: providing the transparent base 154, or 164; and depositing the first or second optical film 151, 161 thereon by a sputtering process, the first or second optical film 151, 161 having a plurality of the first or second bumps 152, 162 thereon configured for diffusing or concentrating light from the light guide plate 110 originally emitted by the light source 130.

Figure 6:
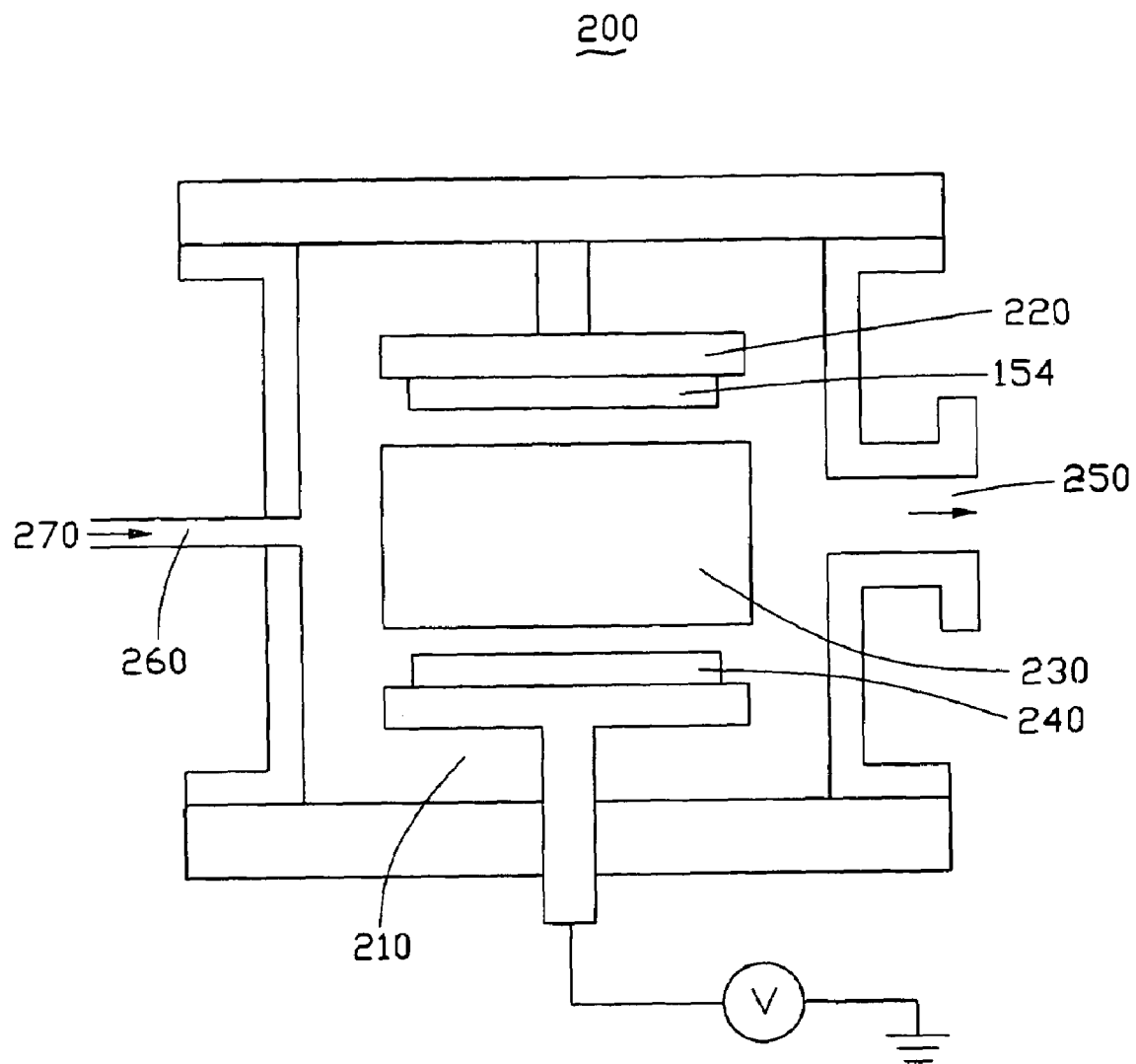
FIG. 6 is a schematic view of a sputtering machine for manufacturing the light diffusion plate and the brightness enhancement shown in FIG. 1.

Referring to FIG. 6, a sputtering machine 200 for manufacturing the light diffusion plate 150 is shown. The transparent base 154 is fastened on a substrate 220 of the sputtering machine 200. A sputtering target 240 is arranged on another substrate (not labeled) spaced from the substrate 220, and has a surface facing the transparent base 154.

In process, a sputtering chamber 210 of the sputtering machine 200 is substantial vacuum. A process gas 270 is introduced into the sputtering chamber 210 via a gas inlet 260. The process gas 270 may include a inert gas, such as argon, that is capable of energetically impinging upon, and sputtering material from a target 240. The argon gas advantageously has a pressure maintained in the range from about 5 mtorr to 20 mtorr. The process gas 270 may also include a reactive gas, such as an oxygen gas, that is capable of reacting with the sputtered material to form the first optical film 151 and first bumps 152 on the transparent base 154. The oxygen gas advantageously has a pressure maintained in the range from about 1 mtorr to 5 mtorr.

The sputtering chamber 210 is then provided with a high-tension electrical field. Thereby, the process gas 270 is ionized to form a plasma 230 between the base 154 and the target 240. The plasma 230 energetically impinges upon and bombards the target 240 to sputter material off the target 240 and onto the base 154. A deposition temperature in the sputtering process is advantageously in the range from about 30 degree Celsius to about 60 degree Celsius. A material of the target is selected from titanium dioxide, aluminium oxide, silicon oxide, and any combination thereof or other suitable transparent material. Furthermore, a deposition speed in the sputtering process is optionally detected, for depositing the film to a desired thickness in a predeterminated sputtering time.

Finally, the spent process gas 270 is exhausted via a gas outlet 250.

The brightness enhancement plate 160 may be manufactured in a similar process as that of the light diffusion plate 150.

Figure 7:
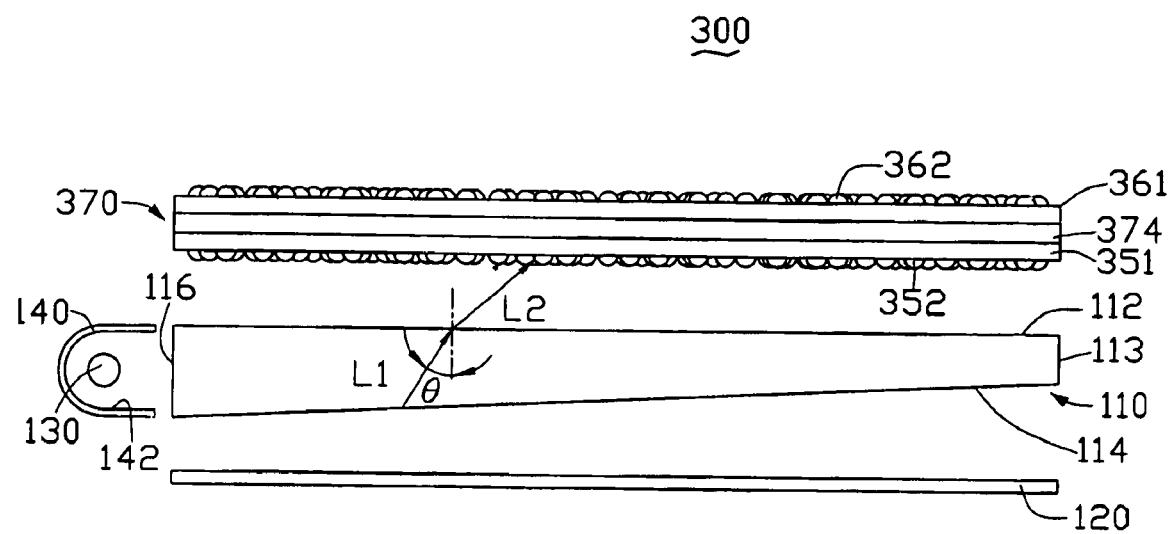
FIG. 7 is a schematic, isometric view of another backlight device, in accordance with a second embodiment.

Referring to FIG. 7, a backlight device 300 is shown in accordance with a second embodiment. The backlight device 300 generally includes a light guide plate 110, a light source 130 arranged at a side face of the light guide plate 110, a lamp cover 140 surrounding the light source 130, a light reflection plate 120 arranged below the light guide plate 110, and a optical element 370 arranged over the light guide plate 110.

The optical element 370 includes a transparent base 374, a first optical film 351 formed on a surface of the base 374, and a second optical film 361 formed on an opposite surface of the base 374. The first optical film 351 faces the light guide plate 110, and has first bumps 352 thereon. The second optical film 361 is arranged facing opposite the light guide plate 110, and has second bumps 362 thereon. The first and second optical films 351, 361, and the first and second bumps 352, 362 are respectively similar to those of the backlight device 100.

A process for manufacturing the optical element 370 is also similar to that of the light diffusion plate 150 or the brightness enhancement plate 160 except that both sides of the transparent base 374 should be sputtered.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A backlight device comprising:
    a light source;
    a light guide plate including a light incident surface for receiving light emitting from the light source, and a light emitting surface for emitting light therefrom;
    a light diffusion structure arranged over the light emitting surface of the light guide plate, the light diffusion structure having a first transparent plate, a first optical film and a plurality of first bumps, the first bumps being formed on the first transparent plate and extending outwardly toward the light emitting surface, the first transparent plate being configured for supporting the first optical film; and
    a brightness enhancement structure arranged over the light diffusion structure, the brightness enhancement structure having a second transparent plate, a second optical film and a plurality of second bumps, the second bumps being formed on the second transparent plate and extending outwardly away from the light diffusion structure, the second transparent plate being configured for supporting the second optical film.

2. The backlight device according to claim 1, wherein the first and second bumps have a height in the range from about 2 microns to about 10 microns.

3. The backlight device according to claim 1, wherein the first optical film has an index of refraction in the range from about 1.4 to about 2.4.

4. The backlight device according to claim 1, wherein the first optical film has an index of refraction in the range from about 1.5 to about 2.2.

5. The backlight device according to claim 1, wherein the second optical film has an index of refraction in the range from about 1.4 to about 1.7.

6. The backlight device according to claim 1, wherein the first and second optical films have a thickness in the range from about 100 nanometers to about 300 nanometers, respectively.

7. The backlight device according to claim 1, wherein the first and second bumps are respectively composed of a material selected from a group consisting of titanium dioxide, aluminum oxide, silicon oxide, and any combination thereof.

8. The backlight device according to claim 1, wherein the first and second bumps have a diameter in the range from about 2 microns to about 50 microns respectively.

9. The backlight device according to claim 1, wherein the first optical film and the second optical film are respectively composed of a material selected from a group consisting of titanium dioxide, aluminum oxide, silicon oxide, and any combination thereof.

* * * * *